United States Patent
Klomp

(10) Patent No.: US 10,680,477 B2
(45) Date of Patent: Jun. 9, 2020

(54) BRUSHLESS ELECTRIC MOTOR SYSTEM COMPRISING A ROTOR, A STATOR AND POWER ELECTRONIC MEANS

(71) Applicant: Saluqi Holding B.V., Best (NL)

(72) Inventor: Martinus Henricus Renier Klomp, Best (NL)

(73) Assignee: Saluqi Holding B.V., Best (NL)

( * ) Notice: Subject to any disclaimer, the term of this patent is extended or adjusted under 35 U.S.C. 154(b) by 0 days.

(21) Appl. No.: 16/312,744

(22) PCT Filed: Jun. 20, 2017

(86) PCT No.: PCT/EP2017/065034
§ 371 (c)(1),
(2) Date: Dec. 21, 2018

(87) PCT Pub. No.: WO2017/220542
PCT Pub. Date: Dec. 28, 2017

(65) Prior Publication Data
US 2019/0372412 A1    Dec. 5, 2019

(30) Foreign Application Priority Data

Jun. 23, 2016  (NL) .................................... 2017030
Jun. 23, 2016  (NL) .................................... 2017031

(51) Int. Cl.
*H02K 1/27*     (2006.01)
*H02K 11/33*    (2016.01)
(Continued)

(52) U.S. Cl.
CPC ............ *H02K 1/2786* (2013.01); *B60L 50/52* (2019.02); *H02K 1/08* (2013.01); *H02K 3/18* (2013.01); *H02K 9/22* (2013.01); *H02K 11/33* (2016.01)

(58) Field of Classification Search
CPC ...... H02P 1/00; H02P 1/04; H02P 1/12; H02P 1/16; H02P 1/18; H02P 1/22; H02P 1/24;
(Continued)

(56) References Cited

U.S. PATENT DOCUMENTS 6,885,162 B2 * 4/2005 Stridsberg ................ H02K 3/28
                                                        310/184
8,436,569 B2 * 5/2013 Fuchs ....................... H02P 1/38
                                                        318/524
(Continued)

FOREIGN PATENT DOCUMENTS

DE  10 2014 11492 A1  4/2016
GB     2462940 A      3/2010

OTHER PUBLICATIONS

International Search Report and Written Opinion dated Aug. 25, 2017, which issued in International Patent Application No. PCT/EP2017/065034 (8 pages).

*Primary Examiner* — Anthony M Paul
(74) *Attorney, Agent, or Firm* — Nixon Peabody LLP

(57) ABSTRACT

A brushless electric motorsystem having integrated power stages, said electric motor system comprising a rotor, a stator, a plurality of power stages, and a cooling system comprising a substantially flat hollow main cool body arranged to support the flowing of a cooling medium inside said hollow main cool body for cooling said main cool body, a base cooling plate connected to a first flat surface of said hollow main cool body and to said plurality of power stages for transferring heat between said plurality of power stages and said base cool plate, heat resistance inserts connected to said base cooling plate and said plurality of electrically excitable coils for transferring heat between said plurality of coils and said base cooling plate wherein said heat resistance inserts provide for a thermal conductivity, thereby creating (Continued)

a thermal buffer such that said electrically excitable coils are cooled less compared to said power stages, by said cooling system.

15 Claims, 5 Drawing Sheets

(51) Int. Cl.
  *B60L 50/52* (2019.01)
  *H02K 1/08* (2006.01)
  *H02K 3/18* (2006.01)
  *H02K 9/22* (2006.01)

(58) Field of Classification Search
  CPC .... H02P 1/26; H02P 1/265; H02P 1/46; H02P 3/00; H02P 3/06; H02P 3/18; H02P 4/00; H02P 5/00; H02P 6/00; H02P 6/002; H02P 6/003; H02P 6/005; H02P 6/08; H02P 6/085; H02P 7/00; H02P 7/0044; H02P 7/0066; H02P 21/00; H02P 23/00; H02P 25/00; H02P 27/00; H02P 27/04; H02P 27/06; H02P 6/14; H02K 1/02; H02K 1/27
  USPC ....... 310/49.28, 49.32, 49.46, 49.53, 154.21, 310/154.32, 156.01; 318/400.01, 400.02, 318/400.14, 700, 701, 721, 727, 800, 801, 318/430
  See application file for complete search history.

(56) References Cited

U.S. PATENT DOCUMENTS

2013/0127280 A1* 5/2013 Sugimoto ............ H02K 1/2766
                                                              310/156.01
2014/0340013 A1   11/2014 Li

* cited by examiner

BRUSHLESS ELECTRIC MOTOR SYSTEM COMPRISING A ROTOR, A STATOR AND POWER ELECTRONIC MEANS

CROSS REFERENCE TO RELATED APPLICATION(S)

This application is a U.S. National Stage Application of International Patent Application No. PCT/EP2017/065034, filed on Jun. 20, 2017, which claims priority to NL Patent Application No. 2017030, filed Jun. 23, 2016 and NL 2017031, filed Jun. 23, 2016, each of which is incorporated herein by reference in its entirety.

The present invention is related to brushless electric motor systems, more specifically to brushless electric motor systems comprising a stator having electrically excitable coils, and a rotor having a plurality of permanent magnets, which rotor is arranged to rotate with respect to the stator.

In general, a brushless electric motor refers to a Direct Current, DC, motor wherein a mechanical brush and a commutator have been modified into electric means. Accordingly, since such a brushless electric motor does not generate abrasion, dust and electric noise, and has good output and efficiency, it is appropriate for, for example, a high-speed rotation type motor, so that various researches and developments have been conducted on the next generation motor.

However, in case of the brushless electric motor, a rotor of a DC motor, around which coils are wound, is substituted with a permanent magnet, and a method of controlling the speed is switched from a voltage control type into an excitation phase control type, so that a driving circuit, in the form of power control means, is required.

In general, a brushless electric motor comprises a rotor comprising a plurality of permanent magnets, and a stator comprising a plurality of electrically excitable coils for generating an induction field for interaction with said plurality of permanent magnets to cause said rotor to rotate with respect to said stator.

The drawbacks of known brushless electric motors is that they are not sufficiently reliable and safe, especially when they are to be used in fields like electric cars or the like.

It is therefore an object of the present invention to provide for a brushless electric motor system which is inherently more reliable and safe.

In order to achieve that object, the invention provides, in a first aspect thereof, in a brushless electric motor system, comprising:

a rotor comprising a plurality of permanent magnets;
a stator comprising at least three groups of six teeth placed adjacently to each other, wherein electrically excitable coils are winded on each of said six teeth, respectively, for generating an induction field for interaction with said plurality of permanent magnets to cause said rotor to rotate with respect to said stator, wherein said brushless electric motor system is controlled using three phases (A, B, C), and wherein each of said at least three groups of six teeth is divided into three pairs (A.1-A.2-B.2-B.1-C.1-C.2, A.2-A.1-B.1-B.2-C.2-C.1) of two coils, wherein the teeth in each group are placed adjacently to each other in such a way that the coils are ordered in A.1-A.2-B.2-B.1-C.1-C.2 or A.2-A.1-B.1-B.2-C.2-C.1, wherein A.1-A.2 comprises two coils in the first phase (A), and wherein B.1-B.2 comprises two coils in the second phase (B), wherein C.1-C.2 comprises two coils in the third phase (C), wherein A.2-A.1 comprises two coils in the first phase (A), and wherein B.2-B.1 comprises two coils in the second phase (B) and wherein C.2-C.1 comprises two coils in the third phase (C), at least nine power stages, such as half h-bridges, wherein each power stage is arranged to drive a single pair (A.1-A.2, B.1-B.2, C.1-C.2, A.2-A.1, B.2-B.1, C.2-C.1) of two coils in such a way that an induction field of a first coil (A.1, B.1, C.1) of said pair is directed oppositely to an induction field of a second coil (A.2, B.2, C.2) of said pair.

It was the insight of the inventor to provide a stator with at least three groups of six teeth placed adjacently to each other, wherein electrically excitable coils are winded on each of said eighteen teeth, respectively, wherein each of said at least three groups of six teeth is divided into three pairs of two coils, wherein the teeth in each group are placed adjacently to each other in such a way that the coils are ordered in A.1-A.2-B.2-B.1-C.1-C.2 or A.2-A.1-B.1-B.2-C.2-C.1. Further, a single power stage is utilized for driving a single pair of two coils. The above accomplishes that the brushless electric motor system is inherently more reliable, safe and redundant compared to conventional brushless electric motor systems.

Another advantage of the brushless electric motor system according to the present invention is that, due to above disclosed features, the power stages, the rotor and the stator can be construed as a single integral part.

In accordance with the present invention, a single power stage may comprise a half H-bridge composed of two Field Effect Transistors, wherein the output of the half H-bridge is directly connected to the pair of coils.

A brushless electric motor is also known as an electronically commutated motor, which is a synchronous motor that is powered by a Direct Current, DC, electric source via power stages, which produce an AC electric signal to drive the coils and thus the motor. In this context, AC, alternating current, does not imply a sinusoidal waveform, but rather a bi-directional current with no restriction on waveform. Additional sensors and electronics eventually control the outputs of the power stages in their amplitude, waveform and frequency, i.e. rotor speed.

The rotor comprises a plurality of permanent magnets which are each placed adjacently to each other along said circumference of said rotor, wherein said permanent magnets are ordered in such a way that there is an alternating order of the north and south poles facing the electrically excitable coils. That is, for example, the first permanent magnet produces a north pole facing the coils, the permanent magnet placed directly adjacent thereto produces a south pole facing the coils, etc.

Based on the above, the invention comprises at least three groups of six teeth, wherein electrically excitable coils are winded on each of the six teeth respectively. As such, according to the invention, the brushless electric motor system comprises at least nine pairs of two coils. As mentioned before, each pair of two coils has its own power stage such that the brushless electric motor system also comprises at least nine power stages. There is thus a direct coupling between the amount of pairs of two coils and the amount of required power stages.

Further, the invention is directed to a brushless electric motor system. In accordance with the present invention, the brushless electric motor system may also be used as a generator for generating electrical power. The brushless electric motor system may also be used as a combined motor and generator in one.

It is noted that, in accordance with the present disclosure, the stator comprises at least eighteen teeth and thus also eighteen electrically excitable coils. These at least eighteen coils are divided into at least three groups. The advantage hereof is that the brushless electric motor system is to provide power even when one of the at least three groups breaks down. As such, at least two groups will still function properly which ensures that a reduced power is still producible by the brushless electric motor system. As such, the concept of the present disclosure is directed to redundancy to a certain extend. That is, the brushless electric motor system is able to provide power even in situations wherein one of the groups has broken down. In an example, the brushless electric motor system comprises:

at least one power electronic means arranged for controlling said at least nine power stages, wherein said at least one power electronic means comprise:
    a first driver for driving at least two of said at least nine power stages, wherein pair of coils in these at least two of said at least nine power stages are in the first phase;
    a second driver for driving another at least two of said at least nine power stages wherein pair of coils in these another at least two of said at least nine power stages are in the second phase;
    a third driver for driving yet another at least two of said at least nine power stages, wherein pair of coils in these yet another at least two of said at least nine power stages are in the third phase.

The inventor has found that, typically, only one driver is needed for driving all the power stages having coils in the same phase. Only a minimum of three drivers are required as the brushless electric motor system is controlled using three phases.

In an example, each of the at least nine power stages comprises a single half H-bridge for driving the pair of two coils.

An H-bridge is an electronic circuit that enables a voltage to be applied across a load in either direction. These circuits are used in different types of fields to allow electric motors to run forwards and backwards. A variation of this electronic circuit uses just the two FET's or transistors on one side of the load, in this example the load is a pair of two coils, similar to a class AB amplifier. Such a configuration is also called a "half bridge".

A half H-bridge is a practical implementation for driving the electrically excitable coils wounded around the teeth of the stator.

In another example, each of said two coils of a pair are connected in parallel, and wherein each of said two coils of said pair are winded differently:
    a first coil (A.1, B.1, C.1) of said pair is winded clockwise, and
    a second coil (A.2, B.2, C.2) of said pair is winded anticlockwise,
    thereby accomplishing that, when actuated, a produced induction field of a first coil (A.1, B.1, C.1) of said pair is opposite to a produced induction field of a second coil (A.2, B.2, C.2) of said pair.

As mentioned above, coils of a particular pair are winded on teeth which are positioned adjacently to each other along the circumference of the stator. In order to make sure that the induction fields generated by the two coils in a pair are oppositely directed to each other, each time a power stage drives these coils, the inventor has found that it is advantageous if these coils are connected in parallel and that the winding of these coils is different. This makes sure that, according to the well known right-hand rule, the induced magnetic fields are directed oppositely.

It is noted that, in accordance with the present disclosure, each phase may comprise at least two coils, wherein each of the adjacent coils are winded differently. As such, each phase may comprise three, four or even five coils placed adjacently to each other, i.e. winded on teeth that are adjacent to each other.

One of the advantages of the example as provided above is that, due to the cascading of the two coils of a single pair of coils, short connections can be provided which reduces any losses, for example Ohmic losses that occur due to the current flowing through the branches of the coils. Another advantage is that effective flux paths are created on relatively high power density.

In a further example, the stator comprises six groups of six teeth and, correspondingly, eighteen power stages, such as half h-bridges. The stator thus comprises in total thirty-six electrically excitable coils. Each power stage is arranged to drive a single pair of two coils in such a way that a pole of a first coil of said pair is opposite to a pole of a second coil of said pair.

This example is advantageous as, due to the redundant implementation, it further improves the reliability of the system. Any electrically excitable coil and/or particular power stage may still break down but the remaining, i.e. properly functioning, coils and power stages will make sure that the brushless electric motor system will still function decently. That is, the brushless electric motor system may have reduced power due to any break down in a coil or particular power stage, but the brushless electric motor system will still function.

In another example, the system comprising three sub control units, each operating one power electronic means, wherein each power electronic means comprises:
    a first driver for driving two of said eighteen power stages, wherein pair of coils in these two power stages are in the first phase;
    a second driver for driving another two of said eighteen power stages wherein pair of coils in these another two are in the second phase;
    a third driver for driving yet another two of said eighteen power stages, wherein pair of coils in these yet another two power stages are in the third phase.

The advantage of this example is that it further improves the reliability of the brushless electric motor system. Two sub control units can make sure that the brushless electric motor system is functioning properly in case one of the three sub control units breaks down. The brushless electric motor system will then, however, function with a reduced power.

Here, it is preferred in case each of the sub control units comprise its own rotor position sensor for determining a position of said rotor with respect to said stator, as in such a case the sub control units do not rely on a single rotor position sensor for determining the position of the rotor with respect to the stator. In accordance with the present invention, a rotor position sensor is, for example, a hall sensor which is a transducer that varies its output voltage in response to a magnetic field. Hall sensors are used for proximity switching, positioning, speed detection, and current sensing applications.

In a further example, the rotor comprises forty-two permanent magnets. The inventor has found that the combination of forty-two permanent magnets and thirty-six electrically excitable coils is the most promising implementation for a brushless electric motor system.

In yet another example, the brushless electric motor system further comprises a master control unit arranged for controlling said three sub control units based on inputs in said master control unit related to any of speed, torque, accelerator and brake signals.

The advantage hereof is that this makes it possible to apply different types of controls for controlling the groups of coils.

In a further example, the rotor comprises a solid rotatable part, wherein said permanent magnets are connected to said rotatable part in such a way that said permanent magnets are skewed with respect to a longitudinal axis of the brushless electric motor system.

In yet another example, the outputs of said pair of two coils in a group A.1-A.2-B.2-B.1-C.1-C.2 and/or outputs of said pair of two coils in a group A.2-A.1-B.1-B.2-C.2-C.1 are connected to each other.

In accordance with the present invention the rotor may surround the stator such that an external rotor is obtained, but the stator may also surround the rotor such that an internal rotor is obtained.

In a second aspect, the invention provides in a method of operating a brushless electric motor system according to any of the examples provided above.

In a third aspect, the invention provides in a motorized electrical vehicle comprising a brushless electric motor system according to any of the examples as provided above.

Another drawback of known brushless electric motors is that they are not sufficiently reliable and safe, especially when they are to be used in fields like electric cars or the like.

It is therefore another objective of the present invention to provide for a brushless electric motor system with a cooling system which is more efficient and simpler compared to the prior art.

In order to achieve that object, the present disclosure provides, in a first aspect thereof, in a brushless electric motor system having integrated power stages, said electric motor system comprising:
- a rotor comprising a plurality of permanent magnets;
- a stator comprising a plurality of teeth placed adjacently to each other, wherein electrically excitable coils are winded on each of said teeth, respectively, for generating an induction field for interaction with said plurality of permanent magnets to cause said rotor to rotate with respect to said stator,
- a plurality of power stages, such as half H-bridges, wherein each power stage is arranged to drive a single pair of two coils of said coils winded on said plurality of teeth;
- a cooling system comprising:
  - a substantially flat hollow main cool body arranged to support the flowing of a cooling medium inside said hollow main cool body for cooling said main cool body;
  - a base cooling plate connected to a first flat surface of said hollow main cool body and to said plurality of power stages for transferring heat between said plurality of power stages and said base cool plate;
  - heat resistance inserts connected to said base cooling plate and said plurality of electrically excitable coils for transferring heat between said plurality of coils and said base cooling plate,
  wherein said heat resistance inserts provide for a thermal conductivity, thereby creating a thermal buffer such that said electrically excitable coils are cooled less compared to said power stages, by said cooling system.

It was the insight of the inventor to provide a cooling system with a single substantially flat hollow main cool body, which is used to cool the electrically excitable coils as well as the power stages. As such, one cooling system is provided to cool both the electrically excitable coils and the power stages.

The inventor noted that, typically, the operating temperature of the electrically excitable coils is much higher compared to the operating temperature of the power stages. As such, in the prior, two cooling systems are used. One cooling system for cooling the power stages and one cooling system for cooling the electrically excitable coils.

The inventor noted that having two cooling systems is not desired as in such a case also two pumps for pumping the cooling medium, two piping systems for transporting the cooling medium, two cool bodies, two cooling plates, etc., are required. All these aspects require space which is usually of the essence in a brushless electric motor system. By using a single cooling system, the weight of the electric motor system, and thus also its efficiency, is further improved.

One of the aspects of the disclosure is that heat resistance inserts are provided between the electrically excitable coils and the base cool plate for amending the thermal conductivity between the coils and the base plate. The advantage hereof is that the electrically excitable coils, having a different desired operating temperature, can be cooled from the same main cool body as compared to the power stages. As such, using a single cooling system, the operating temperature of the electrically excitable coils and the operating temperature of the power stages can be controlled at the same time, even if these operating temperatures differ.

In accordance with the present disclosure, a single power stage may comprise a half H-bridge composed of two Field Effect Transistors, wherein the output of the half H-bridge is directly connected to the pair of electrically excitable coils.

A brushless electric motor is also known as an electronically commutated motor, which is a synchronous motor that is powered by a Direct Current, DC, electric source via power stages, which produce an AC electric signal to drive the coils and thus the motor. In this context, AC, alternating current, does not imply a sinusoidal waveform, but rather a bi-directional current with no restriction on waveform. Additional sensors and electronics eventually control the outputs of the power stages in their amplitude, waveform and frequency, i.e. rotor speed.

The rotor typically comprises a plurality of permanent magnets which are each placed adjacently to each other along said circumference of said rotor, wherein said permanent magnets are ordered in such a way that there is an alternating order of the north and south poles facing the electrically excitable coils. That is, for example, the first permanent magnet produces a north pole facing the coils, the permanent magnet placed directly adjacent thereto produces a south pole facing the coils, etc.

Further, the disclosure is directed to a brushless electric motor system. In accordance with the present invention, the brushless electric motor system may also be used as a generator for generating electrical power. The brushless electric motor system may also be used as a combined motor and generator in one.

In an example, the stator comprising said plurality of teeth has a predefined radius, wherein said heat resistance inserts are connected to said base cooling plate in a circular manner having a substantially same predefined radius as said stator, wherein the number of heat resistance inserts equals the number of electrically excitable coils, respectively.

A single heat resistance insert is thus used per electrically excitable coil, such that each electrically excitable coil has its own insert via which the heat is transferred to the base cooling plate.

Here, the plurality of power stages may be connected to the base cooling plate via a surface area inside a circle spanned by said plurality of heat resistance inserts.

As such, the power stages are situated in such a way that they are comprised within the circle spanned by the coils, i.e. in the middle of the coils. This proved to be an efficient way of placing the power stages. The advantage hereof is that the brushless electric motor system is compact. Further, the use of a single cooling system is here even more beneficial as the power stages are spaced closed to the electrically excitable coils. This makes the manufacturing of the inserts even more simple, as the cooling plate can be placed adjacent to the power stages as well as adjacent to the electrically excitable coils.

The concept is new and inventive compared to the prior art as in the prior art the power stages are not placed within the vicinity of the coils, thereby making the use of a single cooling system more difficult. The inventor found that the power stages can be placed close to the electrically excitable coils, such that the cooling plate can cool the coils as well as the power stages at the same time. In order to get to the coils, and to amend the amount of cooling of the coils, inserts are used which are placed against the coils as well as against the cooling plate.

In an example, the heat resistance inserts comprise solid spacing blocks of a material comprising any of aluminium, stainless steel, etc.

Here, the solid spacing blocks may be provided with through holes for reducing the thermal conductivity thereof.

The inventor has found that the type of material used for the heat resistance inserts does not need to be a thermal isolator. The key aspect of the invention is that a thermal bridge is obtained between the coils and the cooling plate such that the coils are cooled less compared to the power stages. Depending on the length of the inserts and the type of material of the inserts, different operating temperatures of the coils can be obtained.

In another example, the substantially flat hollow main cool body comprises an inlet and an outlet, both provided at a second flat surface of said hollow main cool body, for inputting and outputting said medium, respectively.

The advantage of this example is that the risk of a leak, for example when using water as a cooling medium, in the inlet or outlet will not affect the power stages and/or electronics provided to control the power stages as these are connected to the base cooling plate which is connected to the main cool body at a first flat surface thereof.

The risk of water getting to the power stages and/or the electronics provided to control the power stages, in case of a leak in the inlet and/or outlet, is thus reduced significantly in case the inlet and the outlet are provided another flat side of the hollow main cool body as compared to the case cooling plate.

It is noted that the inlet may be provided in substantially a centre point of said circle. That is, the inlet may be provided in substantially the middle of the circle spanned by the coils/the inserts.

In a detailed example hereof, the substantially flat hollow main cool body comprises flow channels for supporting the flow of said cooling medium between said inlet and said outlet, wherein said flow channels originate from said inlet and extend radially outwardly.

The advantage hereof is explained as follows. The cooling medium enters the substantially flat hollow main cool body at the centre point thereof and then flows radially outwardly. This means that the cooling medium first encounters the power stages as the power stages are placed within the circle spanned by the inserts. This is beneficial as the power stages need to be cooled more compared to the coils, i.e. the operating temperature of the power stages is lower then the operating temperature of the coils. The cooling medium will, of course, be warmed up by the power stages to a higher temperature. This is, however, not an issue as the warmed up cooling medium is still able to cool the coils as the coils are operating at a higher temperature then the power stages.

It is thus advantageous in case the cooling medium first encounters the power stages and, subsequently, encounters the coils.

The cooling system may comprise said cooling medium, wherein said cooling medium is any of air and water.

According to the present disclosure, the cooling medium may be a gas or a liquid.

The advantage of a gas medium is that only a few components are required and that it is therefore very cost effective to implement. No pump, control unit, pipes and a dispensing system are required for cooling the electric motor system. Further, there is no risk on leakage as no liquid is present in the cooling system. A further advantage is that the amount of maintenance to be performed is reduced due to the absence of moving parts in the cooling system.

The advantage of a liquid medium is that less volume, compared to a gaseous medium, is required to obtain the same level of cooling. A liquid medium is further less depending on, for example, the ambient temperature.

In an example, the electric motor system comprises thirty-six electrically excitable coils and eighteen power stages.

In another example, the cooling plate is connected to said main cool body via a pasta, wherein said base cooling plate is connected to said plurality of power stages via a paste, wherein said heat resistance inserts are connected to said base cooling plate via a paste and wherein said plurality of electrically excitable coils are connected to said heat resistance inserts via a pasta.

In a detailed example, the base cooling plate comprises a heat sink.

In an example, each of the power stages comprises a single half H-bridge for driving the electrically excitable coils.

An H-bridge is an electronic circuit that enables a voltage to be applied across a load in either direction. These circuits are used in different types of fields to allow electric motors to run forwards and backwards. A variation of this electronic circuit uses just the two FET's or transistors on one side of the load, in this example the load is a pair of two coils, similar to a class AB amplifier. Such a configuration is also called a "half bridge".

A half H-bridge is a practical implementation for driving the electrically excitable coils wounded around the teeth of the stator.

In yet another example, the rotor surrounds said stator.

In a second aspect, the disclosure provides in a method of operating a brushless electric motor system according to any of the examples provided above.

In a third aspect, the disclosure provides in a motorized electrical vehicle comprising a brushless electric motor system according to any of the examples as provided above.

The expressions, i.e. the wording, of the different aspects comprised by the brushless electric motor system, the method and the motorized electrical vehicle according to the present invention should not be taken literally. The wording of the aspects is merely chosen to accurately express the rationale behind the actual function of the aspects.

In accordance with the present invention, different aspects applicable to the above mentioned examples of the brushless electric motor system, including the advantages thereof, correspond to the aspects which are applicable to method and/or the motorized electrical vehicle according to the present invention.

The above-mentioned and other features and advantages of the invention will be best understood from the following description referring to the attached drawings. In the drawings, like reference numerals denote identical parts or parts performing an identical or comparable function or operation.

DETAILED DESCRIPTION

Figure 1:
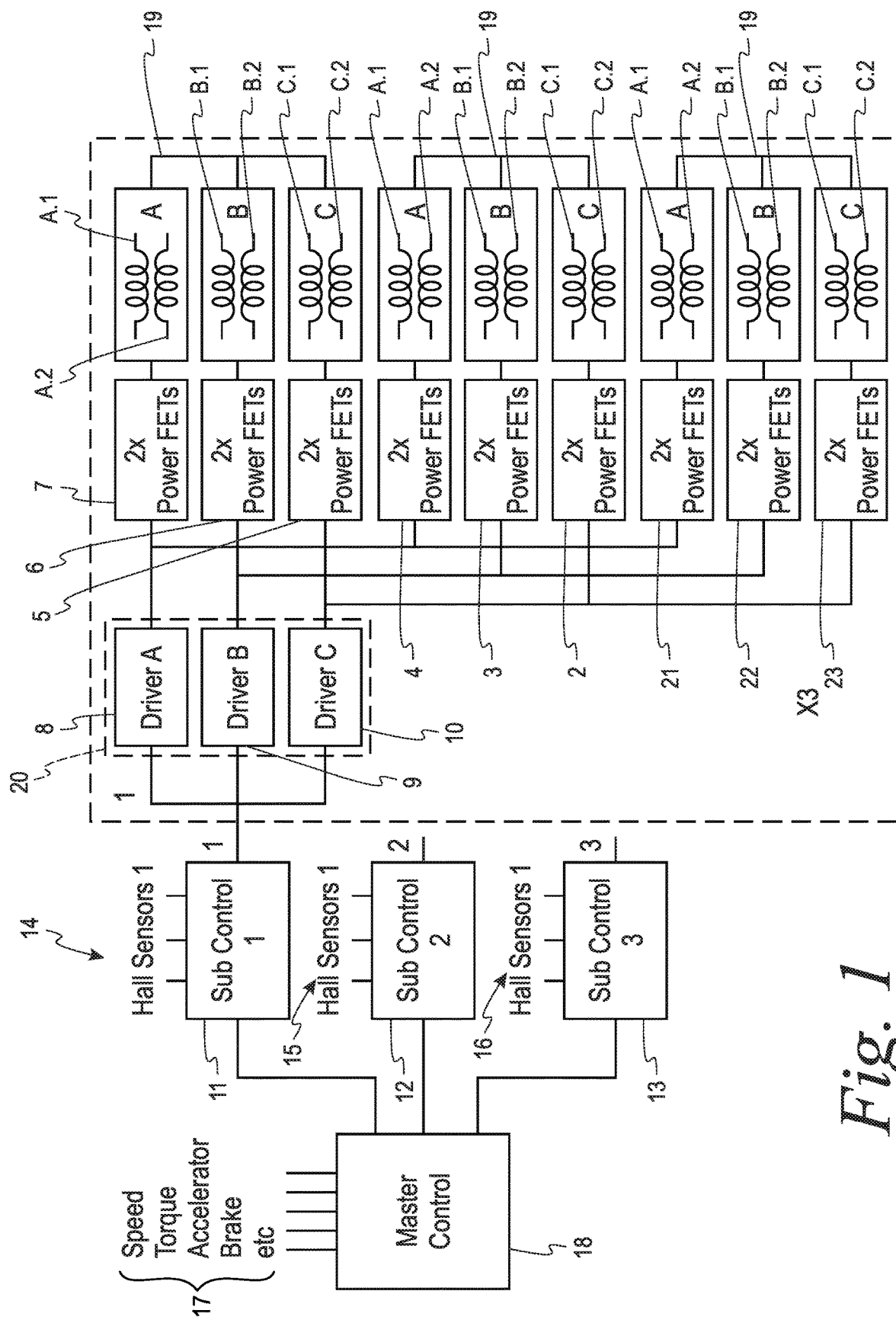
FIG. 1 is a schematic diagram illustrating a particular embodiment of the brushless electric motor system in an example.
Figure 2:
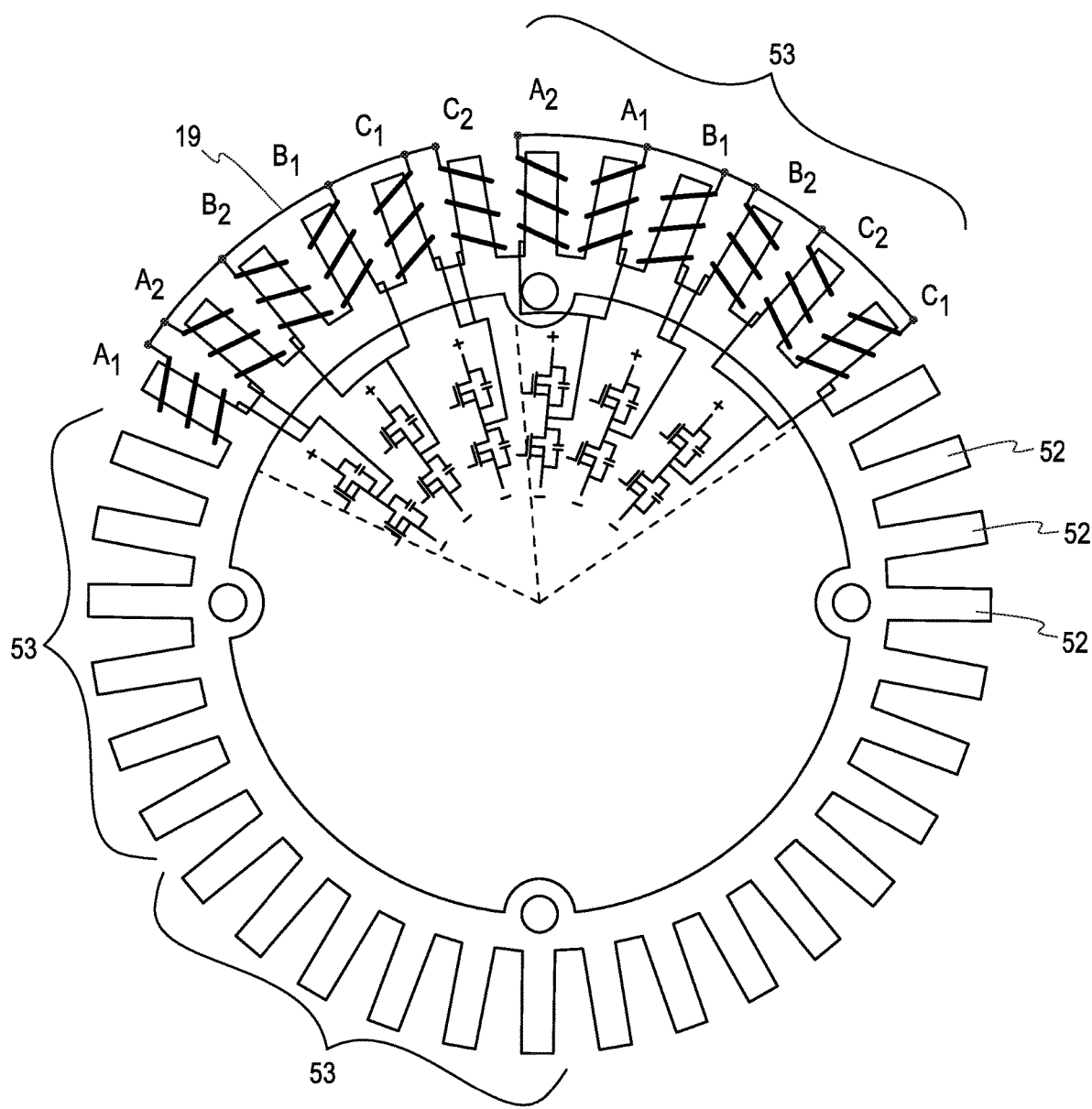
FIG. 2 is a schematic figure illustrating a stator and power stages in an example.
Figure 3:
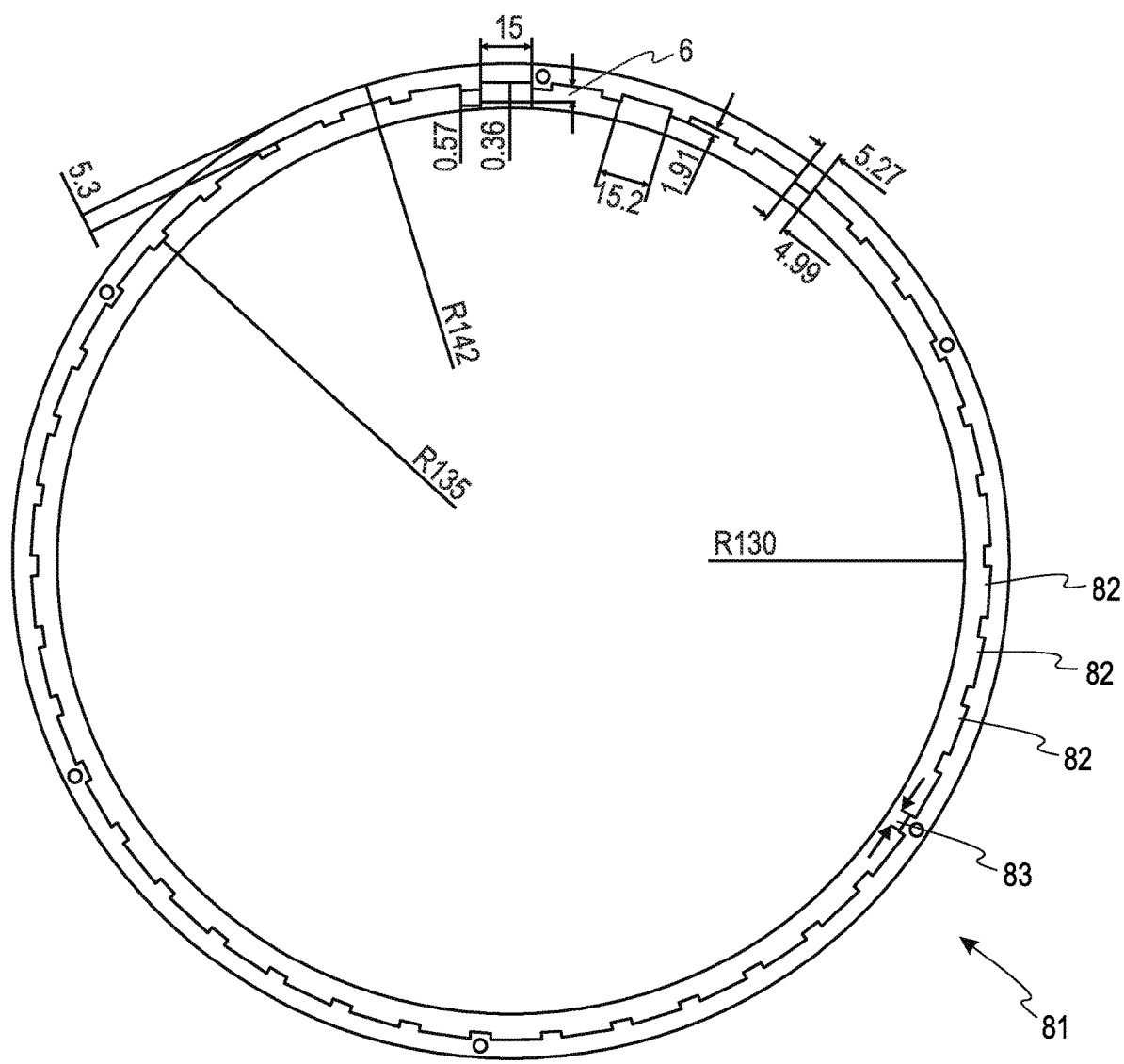
FIG. 3 is a schematic diagram of a rotor in an example, which rotor is suitable to surround a stator shown in FIG. 2.

FIG. 1 is a schematic diagram illustrating a particular example of a brushless electric motor system 1 to be used according to the present invention. The actual stator and rotor of the system 1 are not shown, there aspects are shown in FIG. 2 and FIG. 3, respectively. FIG. 1 thus displays the electronic circuitry including the power stages 2-7 and the electrically excitable coils which are winded on each of the teeth of the stator.

According to the example shown in FIG. 1, a single master control unit 18 is provided which is arranged for controlling three sub control units 11, 12, 13 based on inputs 17 in said master control unit related to any of speed, torque, accelerator and brake signals. It may be advantageous in case such a master control unit 18 is implemented in such a way that it is capable of detecting any form of malfunctioning in the master control unit 18 itself, and, preferably, is able to repair and/or recover from any error or malfunctioning detected. This improved the reliability and the safety aspects of the motor system 1. The functionality of the master control unit 18 may also be implemented redundantly so that in case of an error or malfunctioning in a part of the system, the remainder of the system 1 is able to take over the corresponding functionality thereby increasing the reliability of the system 1 as a whole.

The brushless electric motor system 1 further comprises three sub control units 11, 12, 13, each operating one power electronic means 20. Each sub control unit 11, 12, 13 is coupled to its own rotor position sensor, not shown, via inputs 14, 15, 16, respectively, for determining a position of the rotor with respect to said stator. This aspect further improves the reliability of the system 1 as a whole, as even in case one of the rotor position sensors fails, the motor 1 is still able to function properly. That is, a malfunctioning in one of the rotor position sensors will lead to a sub control unit 11, 12, 13 to malfunction, i.e. to function improperly. As this specific motor 1 comprises three sub control units 11, 12, 13, the remaining two sub control units 11, 12, 13, i.e. the sub control units 11, 12, 13 which are operating properly, will make sure that the motor 1 is at least functioning correctly. This does mean that the motor 1 has a reduced available power as one of the sub control units 11, 12, 13 is not contributing thereto.

The rotor position sensors are typically comprised of hall sensors or rotary encoders. Rotary encoders along with their controllers could be used to exactly what the angle of the rotor is with respect to the stator. A Hall sensor is, for example, placed in an appropriate position. It can sense if in front of it is the North or the South pole. Each of the Hall sensors will then transmit this signal to its corresponding sub control unit 11, 12, 13. The sub control units 11, 12, 13 will, subsequently, then switch on or off the appropriate drivers 8, 9, 10, needed in order to provide the torque.

Each of the power electronic means 20 comprises a first driver 8 for driving two of the eighteen power stages, i.e. the power stages referred to with reference numerals 4 and 7, and comprises a second driver 9 for driving another two of said eighteen power stages, i.e. the power stages referred to with reference numerals 3 and 6, and further comprises a third driver 10 for driving yet another two of said eighteen power stages, i.e. the power stages referred to with reference numerals 2 and 5. Referring still to FIG. 1, the first driver 8 is further shown for driving power stage with reference number 21. The second driver 9 is further shown for driving power stage with reference number 22. The third driver 10 is further shown for driving power stage with reference number 23.

The above is explained with reference to one of the sub control units 11, i.e. only the sub control unit referred to with reference numeral 11. It is to be understood that both of the other two sub control units 12, 13 are coupled to a power electronic means, and that these power electronic means each are coupled to six power stages, etc. This adds up to a total of eighteen power stages, divided over nine drivers, three sub control units and a single master control unit. Such an implementation is beneficial for the reliability of the brushless electric motor system as a whole.

The power stages 2-7 and the coils which are winded around the teeth of the stator tend to breakdown the most. As such, the brushless electric motor system 1 is designed in such a way that a failure occurring in these components is not destructive for the functioning in the system 1 as a whole. This is accomplished, amongst other, by the redundancy aspects of the present example.

As such, it was the insight of the inventor to couple one power stage to each pair of coils. For example, power stage indicated with reference numeral 7 is coupled to the pair of coils A.1, A.2 which are controlled using the phase A.

Each power stage 2-7 comprises a half H-bridge for driving a pair of coils. A half H-bridge is an electronic circuit comprising two transistors or two Field Effect Transistors, FET, which are controlled by a control signal in such a way that in case a high control signal is supplied a load is coupled to a high input voltage, and in case a low control signal is supplied the load is coupled to a low input voltage. Each of the driver 8, 9, 10 should be designed in such a way that it is not possible to drive the half H-bridge in such a way that both of the two FET's are in their conductive state such that a short circuit between the high input voltage and the low input voltage occurs.

So, following the reasoning provided above, only one pair of coils are affected in case a single half H-bridge, for example a particular FET thereof, breaks down. The remaining of the pairs of coils still function properly thereby contributing to the reliability of the system 1.

Each of the two coils of a pair are driven such that the induction field of a first coil A.1, B.1, C.1 of the pair is directed oppositely to an induction field of a second coil A.2, B.2, C.2 of the pair.

This aspect may be accomplished by connecting each of the two coils of a pair, for example coils referred to with reference numeral A.1 and A.2, in parallel, wherein each of the two coils of the pair are winded differently. That is, a first coil, for example coil referred to with reference numeral A.1, is winded clockwise and the second coil, i.e. the coil referred to with reference numeral A.2, is winded anticlockwise. This accomplishes that, when the half H-bridge 7 drives the coils A.1 and A.2, the produced induction fields of these two coils are oppositely directed. Effectively, a magnetic north pole and a magnetic south pole are created in such a way.

In this example the coils are placed adjacently to each other in the order of A.1-A.2-B.2-B.1-C.1-C.2 or A.2-A.1-B.1-B.2-C.2-C.1. Here, the number following the letter A, B or C indicates the direction of the magnetic induction field. So, coils referred to with letters having a same number produce a magnetic induction field in the same direction. This means that, when actuated, the coil A.2 produces a magnetic induction field in the same direction as the coils B.2 and C.2. Accordingly, when actuated, the coil A.1 produces a magnetic induction field in the same direction as the coils B.1 and C.1.

Further, the rotor comprises permanent magnets which have either a magnetic north pole or a magnetic south pole directed to the coils of the stator. The permanent magnets are oriented in such a way the magnetic poles are alternately ordered, i.e. first a magnetic north pole directed to the coils, then a magnetic south pole directed to the coils, then again a magnetic north pole directed to the coils, etc. The above ensures that the rotor rotates smoothly with respect to the stator.

The outputs of the coils in each group of three pairs of coils 19 are connected to each other in order to further improve the reliability of the system 1.

Based on the above, the brushless electric motor system 1 comprises thirty-six electrically excitable coils winded on the teeth of the stator, and forty-two permanent magnets comprised by the rotor.

FIG. 2 is a schematic figure illustrating a stator 51 and combined power stages, i.e. referred to with reference H, according to the present example.

In this particular example, the stator 51 is designed in such a way that a rotor is to surround the stator 51. The stator 51 comprises a plurality of teeth 52, wherein electrically excitable coils are winded on each of those teeth 52. Here, the stator 51 comprises exactly thirty-six teeth 52, divided in to six groups 53 of six teeth 52 each. The groups, and thus also the teeth 52 comprised by the groups 53, are placed, i.e. oriented, adjacently to each other along a circumference of the rotor 51. The electrically excitable coils, i.e. the ones referred to with references A.1-A.2-B.2-B.1-C.1-C.2 or A.2-A.1-B.1-B.2-C.2-C.1, are to generate magnetic induction fields for interaction with a plurality of permanent magnets comprised by the rotor (not shown). This causes the rotor to rotate with respect to the stator 51.

The teeth 52 may comprise a magnetic core for enhancing the produced magnetic field. The shape of any tooth 52 is such that a magnetic field produced by a coil winded on such a tooth 52 is directed radially with respect to an inner axis of the stator 51, i.e. towards the permanent magnets comprised by the rotor.

FIG. 3 is a schematic diagram of a rotor 81 according to the present example, which rotor 81 is suitable to surround a stator shown in FIG. 2. Here, the rotor comprises forty-two recesses 82, which recesses 82 are used to accommodate the permanent magnets (not shown). The recesses are spaced 83 with respect to each other such that the magnets do not, or minimally, influence each other. The stator 51 of FIG. 2 is to be placed inside the rotor 81 shown in FIG. 3. The rotor 81 is further rotatably mounted to the stator 51 such that the rotor 81 is able to rotate with respect to the stator 51.

In accordance with the present example, the rotor 81 may also be implemented as a shaft or the like, wherein the stator 51 surround the rotor 81.

Figure 4:
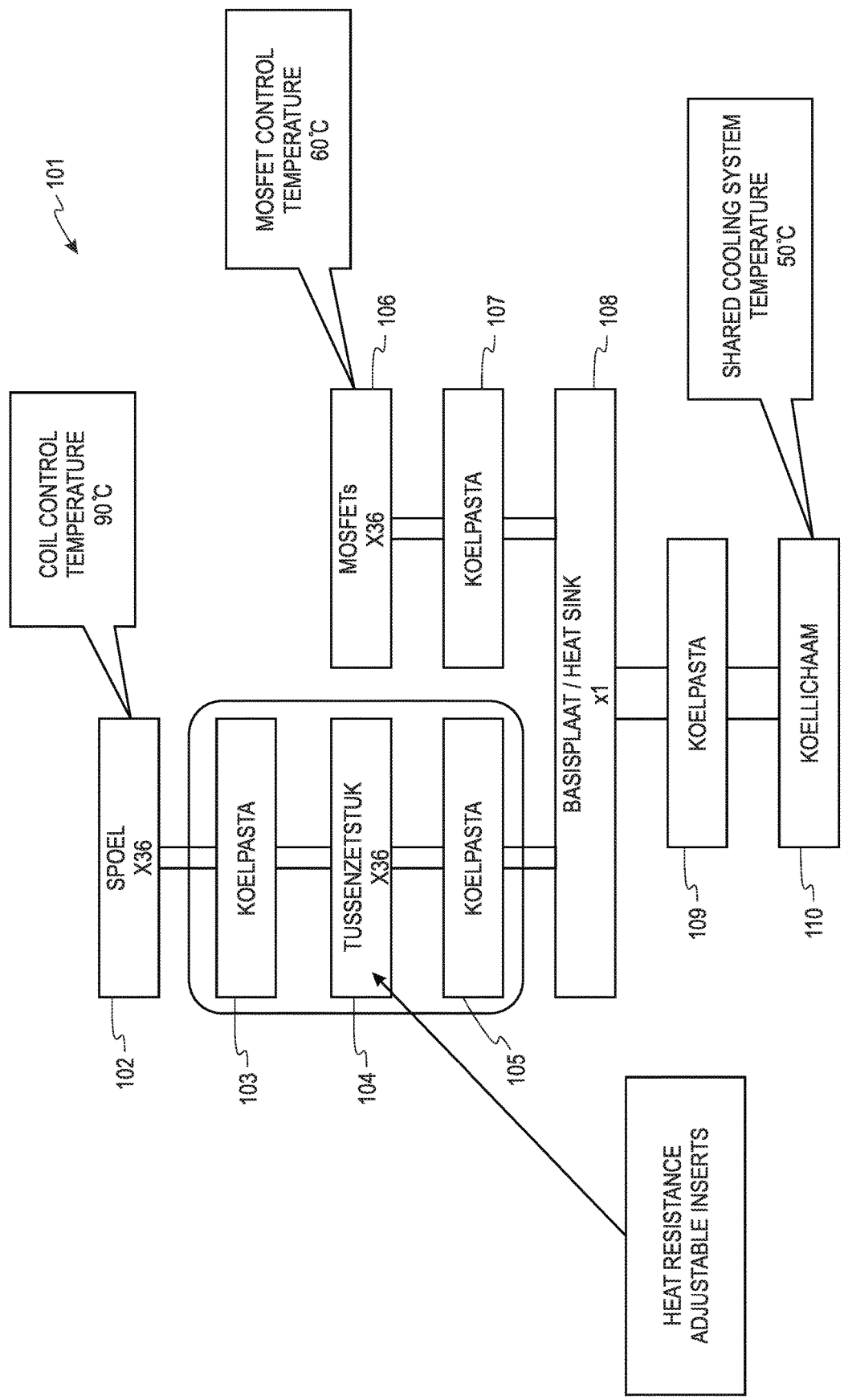
FIG. 4 is a schematic diagram of a brushless electric motor system according to the present invention.

FIG. 4 is a schematic layout of a brushless electric motor system according to the present disclosure.

Here, a brushless electric motor system 101 having integrated power stages is shown. The invention is displayed as a schematic diagram as to explain the functionality. The actual stator and rotor of the system 101 are not shown.

The electric motor system comprise a rotor comprising a plurality of permanent magnets and a stator comprising a plurality of teeth placed adjacently to each other, wherein electrically excitable coils are winded on each of said teeth, respectively, for generating an induction field for interaction with said plurality of permanent magnets to cause said rotor to rotate with respect to said stator.

Further, a plurality of power stages 106, such as half H-bridges, are provided, wherein each power stage is arranged to drive a single pair of two coils of said coils winded on said plurality of teeth. In the present example, the electric motor system 101 comprises thirtysix electrically excitable coils, eighteen power stages 106, wherein each power stage comprises a single H-bridge and thus two Metal Oxide Semiconductor, MOS, Field Effect Transistor's, FETs. It are these MOSFET's that need to be cooled efficiently by the cooling system according to the present invention.

In FIG. 4 is the cooling system shown, which comprises a substantially flat hollow main cool body 110 arranged to support the flowing of a cooling medium inside said hollow main cool body for cooling said main cool body, a base cooling plate 108 connected to a first flat surface of said hollow main cool body and to said plurality of power stages for transferring heat between said plurality of power stages and said base cool plate, heat resistance inserts 104 connected to said base cooling plate and said plurality of electrically excitable coils 102 for transferring heat between said plurality of coils and said base cooling plate 108, The heat resistance inserts 104 provide for a thermal conductivity, thereby creating a thermal buffer such that said electrically excitable coils 102 are cooled less compared to said power stages 106, by said cooling system.

In the present example, the cooling medium is of a temperature close to about 50 degrees Celsius. The operating temperature of the MOSFET's is about 60 degrees Celsius. The MOSFET's are directly connected to the base cooling plate 108 in order to obtain sufficient cooling for the MOSFET's to their operating temperature. The operating temperature of the coils is about 90 degrees Celsius, i.e. much higher compared to the operating temperature of the MOSFET's. As such, the inventor has found to provide inserts 104 between the coils 102 and the base cooling plate 108, such that a single cooling system can be used for cooling the MOSFET's to about 60 degrees Celsius and the coils 102 to about 90 degrees Celsius. The inserts 104 thus provide for a thermal conductivity, thereby creating a thermal buffer such that the electrically excitable coils 102 are cooled less compared to the power stages 106, by the cooling system.

Pasta's 103, 105, 109, 107 may be used to connect each of the above mentioned elements firmly to each other, such that heat transfer between these elements is improved.

Figure 5:
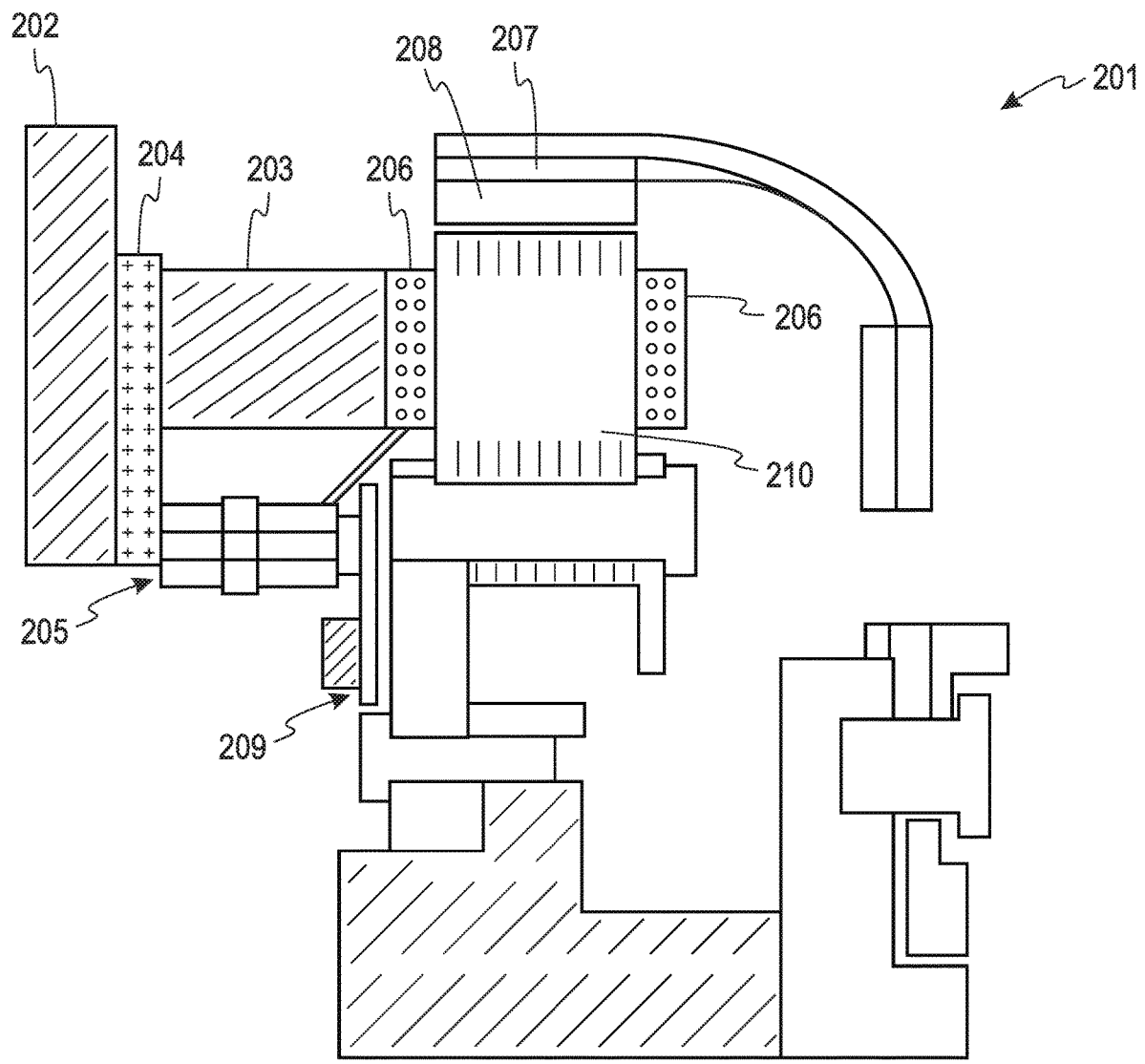
FIG. 5 is a schematic layout of a brushless electric motor system according to the present invention.

FIG. 5 is a schematic layout of a brushless electric motor system 201 according to the present invention. Here, the hollow main cool body 202, the base cooling plate 204, the heat resistance inserts 203, the electrically excitable coils 206, the power stages 205 are indicated in a layout position so that it is clear how the elements are oriented with respect to each other.

The power stages 205, i.e. the MOSFET's as indicated above, are placed on a printed circuit board, PCB, 209, which further comprises the control logic for controlling the MOSFET's. The coils 206 are winded on the teeth 210 of the stator for generating an induction field for interaction with the plurality of permanent magnets 208 to cause the rotor to rotate with respect to the stator.

Clauses

Clause 1. A brushless electric motor system having integrated power stages, said electric motor system comprising:
  a rotor comprising a plurality of permanent magnets;
  a stator comprising a plurality of teeth placed adjacently to each other, wherein electrically excitable coils are winded on each of said teeth, respectively, for generating an induction field for interaction with said plurality of permanent magnets to cause said rotor to rotate with respect to said stator,
  a plurality of power stages, such as half H-bridges, wherein each power stage is arranged to drive a single pair of two coils of said coils winded on said plurality of teeth;
  a cooling system comprising:
    a substantially flat hollow main cool body arranged to support the flowing of a cooling medium inside said hollow main cool body for cooling said main cool body;
    a base cooling plate connected to a first flat surface of said hollow main cool body and to said plurality of power stages for transferring heat between said plurality of power stages and said base cool plate;
    heat resistance inserts connected to said base cooling plate and said plurality of electrically excitable coils for transferring heat between said plurality of coils and said base cooling plate,
  wherein said heat resistance inserts provide for a thermal conductivity, thereby creating a thermal buffer such that said electrically excitable coils are cooled less compared to said power stages, by said cooling system.

Clause 2. A brushless electric motor system according to clause 1, wherein said stator comprising said plurality of teeth has a predefined radius, wherein said heat resistance inserts are connected to said base cooling plate in a circular manner having a substantially same predefined radius as said stator, wherein the number of heat resistance inserts equals the number of electrically excitable coils, respectively.

Clause 3. A brushless electric motor system according to clause 2, wherein said plurality of power stages are connected to the base cooling plate via a surface area inside a circle spanned by said plurality of heat resistance inserts.

Clause 4. A brushless electric motor system according to any of the previous clauses, wherein said heat resistance inserts comprise solid spacing blocks of a material comprising any of aluminium and stainless steel.

Clause 5. A brushless electric motor system according to clause 4, wherein said solid spacing blocks are provided with through holes for reducing the thermal conductivity thereof.

Clause 6. A brushless electric motor system according to any of the previous clauses, wherein said substantially flat hollow main cool body comprises an inlet and an outlet, both provided at a second flat surface of said hollow main cool body, for inputting and outputting said medium, respectively.

Clause 7. A brushless electric motor system according to clause 6 and 3, wherein said inlet is provided in substantially a centre point of said circle.

Clause 8. A brushless electric motor system according to clause 7, wherein said substantially flat hollow main cool body comprises flow channels for supporting the flow of said cooling medium between said inlet and said outlet, wherein said flow channels originate from said inlet and extend radially outwardly.

Clause 9. A brushless electric motor system according to any of the previous clauses, wherein said cooling system comprises said cooling medium, wherein said cooling medium is any of air and water.

Clause 10. A brushless electric motor system according to any of the previous clauses, wherein said electric motor system comprises thirty-six electrically excitable coils and eighteen power stages.

Clause 11. A brushless electric motor system according to any of the previous clauses, wherein said base cooling plate is connected to said main cool body via a pasta, wherein said base cooling plate is connected to said plurality of power stages via a paste, wherein said heat resistance inserts are connected to said base cooling plate via a paste and wherein said plurality of electrically excitable coils are connected to said heat resistance inserts via a pasta.

Clause 12. A brushless electric motor system according to any of the previous clauses, wherein said base cooling plate comprises a heat sink.

Clause 13. A brushless electric motor system according to any of the previous clauses, wherein said rotor surrounds said stator.

Clause 14. A method of operating a brushless electric motor system according to any of the previous clauses.

Clause 15. A motorized electrical vehicle comprising a brushless electric motor system according to any of the clauses 1-13.

The present invention is not limited to the embodiments, the clauses and/or the examples as disclosed above, and can be modified and enhanced by those skilled in the art beyond the scope of the present invention as disclosed in the appended claims without having to apply inventive skills.

The invention claimed is:

1. A brushless electric motor system, comprising:
  a rotor comprising a plurality of permanent magnets;
  a stator comprising at least three groups of six teeth placed adjacently to each other, wherein electrically excitable coils are winded on each of said six teeth of each group, respectively, for generating an induction field for interaction with said plurality of permanent magnets to cause said rotor to rotate with respect to said stator, wherein said brushless electric motor system is controlled using three phases (A, B, C), and wherein each of said at least three groups of six teeth is divided into three pairs of two coils (A.1-A.2-B.2-B.1-C.1-C.2, A.2-A.1-B.1-B.2-C.2-C.1), wherein the teeth in each group are placed adjacently to each other in such a way that the coils are ordered in A.1-A.2-B.2-B.1-C.1-C.2 or A.2-A.1-B.1-B.2-C.2-C.1, wherein A.1-A.2 comprises two coils in the first phase (A), and wherein B.1-B.2 comprises two coils in the second phase (B), wherein C.1-C.2 comprises two coils in the third phase (C), wherein A.2-A.1 comprises two coils in the first phase (A), and wherein B.2-B.1 comprises two coils in the second phase (B) and wherein C.2-C.1 comprises two coils in the third phase (C), at least nine power stages, such as half h-bridges, wherein each power stage is arranged to drive a single pair of two coils (A.1-A.2, B.1-B.2, C.1-C.2, A.2-A.1, B.2-B.1, C.2-C.1) in such a way that an induction field of a first coil (A.1, B.1, C.1) of said pair is directed oppositely to an induction field of a second coil (A.2, B.2, C.2) of said pair.

2. A brushless electric motor system according to claim 1, wherein said system comprises:

at least one power electronic means arranged for controlling said at least nine power stages, wherein said at least one power electronic means comprise:

a first driver for driving at least two of said at least nine power stages, wherein pair of coils in these at least two of said at least nine power stages are in the first phase;

a second driver for driving another at least two of said at least nine power stages wherein pair of coils in these another at least two of said at least nine power stages are in the second phase;

a third driver for driving yet another at least two of said at least nine power stages, wherein pair of coils in these yet another at least two of said at least nine power stages are in the third phase.

3. A brushless electric motor system according to claim 2, wherein said stator comprising six groups of six teeth and, correspondingly, eighteen power stages, such as half h-bridges, wherein each power stage is arranged to drive a single pair (A.1-A.2, B.1-B.2, C.1-C.2, A.2-A.1, B.2-B.1, C.2-C.1) of two coils in such a way that a pole of a first coil (A.1, B.1, C.1) of said pair is opposite to a pole of a second coil (A.2, B.2, C.2) of said pair, and wherein said system comprising three sub control units, each operating one power electronic means, wherein each power electronic means comprises:

a first driver for driving two of said eighteen power stages;

a second driver for driving another two of said eighteen power stages;

a third driver for driving yet another two of said eighteen power stages.

4. A brushless electric motor system according to claim 3, wherein each of said sub control units comprise its own rotor position sensor for determining a position of said rotor with respect to said stator.

5. A brushless electric motor system according to claim 3, wherein said brushless electric motor system further comprises a master control unit arranged for controlling said three sub control units based on inputs in said master control unit related to any of speed, torque, accelerator and brake signals.

6. A brushless electric motor system according to claim 1, wherein each of said at least nine power stages comprises a half H-bridge.

7. A brushless electric motor system according to claim 1, wherein each of said two coils of a pair are connected in parallel, and wherein each of said two coils of said pair are winded differently:

a first coil (A.1, B.1, C.1) of said pair is winded clockwise, and a second coil (A.2, B.2, C.2) of said pair is winded anticlockwise, thereby accomplishing that, when actuated, a produced induction field of a first coil (A.1, B.1, C.1) of said pair is opposite to a produced induction field of a second coil (A.2, B.2, C.2) of said pair.

8. A brushless electric motor system according to claim 1, wherein said stator comprising six groups of six teeth and, correspondingly, eighteen power stages, such as half h-bridges, wherein each power stage is arranged to drive a single pair (A.1-A.2, B.1-B.2, C.1-C.2, A.2-A.1, B.2-B.1, C.2-C.1) of two coils in such a way that a pole of a first coil (A.1, B.1, C.1) of said pair is opposite to a pole of a second coil (A.2, B.2, C.2) of said pair.

9. A brushless electric motor system according to claim 1, wherein said rotor comprises forty-two permanent magnets.

10. A brushless electric motor system according to claim 1, wherein said rotor comprises a solid rotatable part, wherein said permanent magnets are connected to said rotatable part in such a way that said permanent magnets are skewed with respect to a longitudinal axis of said brushless electric motor system.

11. A brushless electric motor system according to claim 1, wherein outputs of said pair of two coils in a group A.1-A.2-B.1-B.2-C.1-C.2, and/or outputs of said pair of two coils in a group A.2-A.1-B.2-B.1-C.2-C.1 are connected to each other.

12. A brushless electric motor system according to claim 1, wherein said rotor surrounds said stator.

13. A brushless electric motor system according to claim 1, wherein said stator surrounds said rotor.

14. A method of operating a brushless electric motor system according to claim 1.

15. A motorized electrical vehicle comprising a brushless electric motor system according to claim 1.

* * * * *